(12) United States Patent
Faruquie et al.

(10) Patent No.: US 6,813,607 B1
(45) Date of Patent: Nov. 2, 2004

(54) TRANSLINGUAL VISUAL SPEECH SYNTHESIS

(75) Inventors: Tanveer Afzal Faruquie, New Delhi (IN); Chalapathy Neti, Yorktown Heights, NY (US); Nitendra Rajput, New Delhi (IN); L. Venkata Subramaniam, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,582

(22) Filed: Jan. 31, 2000

(51) Int. Cl.[7] .............................................. G10L 11/00
(52) U.S. Cl. ...................... 704/276; 704/258; 704/260; 704/270
(58) Field of Search ................................ 704/270, 258, 704/235, 275, 260, 276; 345/473; 434/185

(56) References Cited

U.S. PATENT DOCUMENTS

| | | | | |
|---|---|---|---|---|
| 5,608,839 A | * | 3/1997 | Chen .......................... | 704/235 |
| 5,657,426 A | * | 8/1997 | Waters et al. ............... | 704/276 |
| 5,878,396 A | * | 3/1999 | Henton ........................ | 704/276 |
| 5,995,119 A | * | 11/1999 | Cosatto et al. .............. | 345/473 |
| 6,112,177 A | * | 8/2000 | Cosatto et al. .............. | 704/260 |
| 6,122,616 A | * | 9/2000 | Henton ........................ | 704/258 |
| 6,250,928 B1 | * | 6/2001 | Poggio et al. .............. | 434/185 |
| 6,317,716 B1 | * | 11/2001 | Braida et al. ............... | 704/275 |
| 6,366,885 B1 | * | 4/2002 | Basu et al. .................. | 704/270 |
| 6,449,595 B1 | * | 9/2002 | Arslan et al. ............... | 704/235 |
| 6,539,354 B1 | * | 3/2003 | Sutton et al. ............... | 704/260 |

FOREIGN PATENT DOCUMENTS

| | | | |
|---|---|---|---|
| DE | 0674315 A1 * | 9/1995 | ......... G11B/27/032 |
| JP | 05-298346 | 11/1993 | |
| WO | WO99/46732 | 9/1999 | |

OTHER PUBLICATIONS

R.E. Donovan, et al., "The IBM Trainable Speech Synthesis System", *International Conference on Speech and Language Processing*, 1998.
E.D. Petajan, et al., "An Improved Automatic Lipreading System to Enhance Speech Recognition", *Proc. OHI*, 1988, pp. 19–25.
T. Chen et al., "Audio–Visual Integration in Multimodal Communication", Proceedings of the IEEE, vol. 86, No. 5, May 1998.
F. Lavagetto, et al., "Lipreadable Frame Animation Driven by Speech Parameters", 1994 International Symposium on Speech, Image Processing and Neural Networks, Apr. 13–16, 1994, Hong Kong.

* cited by examiner

*Primary Examiner*—Doris H. To
*Assistant Examiner*—Michael N. Opsasnick
(74) *Attorney, Agent, or Firm*—Whitham, Curtis & Christofferson, P.C.; T. Rao Coca

(57) ABSTRACT

A computer implemented method in a language independent system generates audio-driven facial animation given the speech recognition system for just one language. The method is based on the recognition that once alignment is generated, the mapping and the animation hardly have any language dependency in them. Translingual visual speech synthesis can be achieved if the first step of alignment generation can be made speech independent. Given a speech recognition system for a base language, the method synthesizes video with speech of any novel language as the input.

9 Claims, 3 Drawing Sheets

TRANSLINGUAL VISUAL SPEECH SYNTHESIS

CROSS-REFERENCE TO RELATED APPLICATION

The subject matter of this application is related to co-pending patent application Ser. No. 09/384,763 filed on Aug. 27, 1999, by Sankar Basu et al. for "Speech Driven Lip Synthesis Using Viseme Based Hidden Markov Models" and assigned to a common assignee herewith. The disclosure of application Ser. No. 09/384,763 is incorporated herein by reference.

DESCRIPTION

BACKGROUND OF THE INVENTION

1. Field of the Invention

The present invention generally relates to visual speech synthesis and, more particularly, to a method of implementing audio driven facial animation system in any language using a speech recognition system and visemes of a different language.

2. Background Description

Audio-driven facial animation is an interesting and evolving technique in the field of human-computer interaction. The realization of a natural and friendly interface is very important in human-computer interface. Speech recognition and computer lip-reading has been developed as a means of input for information interaction with the machine. It is also important to provide a natural and friendly means to render the information. Visual speech synthesis is very important in this respect as it can provide various kinds of animated computer agents which look very realistic. Furthermore, it can also be used for distance learning applications where it can obviate the transmission of video. It can also be a useful tool for hearing impaired people to compensate for lack of auditory information.

Techniques exist for synthesizing the speech given the text as input to the system. These text to speech synthesizers work by producing a phonetic alignment of the text to be pronounced and then by generating the smooth transitions in corresponding phones to get the desired sentence. See R. E. Donovan and E. M. Eide, "The IBM Trainable Speech Synthesis System", *International Conference on Speech and Language Processing*", 1998. Recent work in bimodal speech recognition uses the fact that the audio and corresponding video signals have dependencies which can be exploited to improve the speech recognition accuracy. See T. Chen and R. R. Rao, "Audio-Visual Integration in Multimodal Communication", *Proceedings of the IEEE*, vol. 86, no. 5, May 1998, pp. 837–852, and E. D. Petajan, B. Bischolf, D. Bodolf, and N. M. Brooke, "An Improved Automatic Lipreading System to Enhance Speech Recognition", *Proc. OHI,* 1988, pp. 19–25. A viseme-to-phoneme mapping is required to convert the score from video space to the audio space. Using such a mapping and the text-to-speech synthesis, a text-to-video synthesizer can be built. This synthesis or facial animation can be driven by text or speech audio, as the application may desire. In the later case, the phonetic alignment is generated from the audio with the help of the true word string representing the spoken word.

Researchers have tried various ways of synthesizing visual speech from a given audio signal. In the simplest method, vector quantization is used to divide the acoustic vector space into a number of subspaces (generally equal to the number of phones) and the centroid of each subspace is mapped to a distinct viseme. During the synthesis time, the nearest centroid is found for the incoming audio vector and the corresponding viseme is chosen as the output. In F. Lavagetto, Arzarello and M. Caranzano, "Lipreadable Frame Automation Driven by Speech Parameters", *International Symposium on Speech, Image Processing and Neural Networks,* 1994, ISSIPNN, the authors have used Hidden Markov Models (HMMs) which are trained using both audio and video features as follows. During the training period, viterbi alignment is used to get the most likely HMM state sequence for a given speech. Now, for a given HMM state, all the corresponding image frames are chosen and an average of their visual parameters is assigned to the HMM state. At the time of synthesis, input speech is aligned to the most likely HMM sequence using the viterbi decoding. Image parameters corresponding to the most likely HMM state sequence are retrieved, and this visual parameter sequence is animated with proper smoothing.

Recently, co-pending patent application Ser. No. 09/384,763 describes a novel way of generating the visemic alignments from an audio signal which makes use of viseme based HMM. In this approach, all the audio vectors corresponding to a given viseme are merged into a single class. Now, this viseme based audio data is used to train viseme based audio HMMs. During the synthesis time, input speech is aligned with the viseme based HMM state sequence. Now, the image parameters corresponding to these viseme based HMM state sequences are animated with the required smoothing. See also T. Ezzai and T. Poggio, "Miketalk: A Talking Facial Display Based on Morphing Visemes", *Proceedings of IEEE Computer Animation '98*, Philadelphia, Pa, June 1998, pp. 96–102.

All of the above approaches require training of a speech recognition system which is used for generating alignment of the input speech needed for synthesis. Further, these approaches require a speech recognition system in the language in which audio is provided to get the time alignment for the phonetic sequence of the audio signal. However, building a speech recognition system is a very tedious and time consuming task.

SUMMARY OF THE INVENTION

It is therefore an object of the present invention to provide a novel scheme to implement a language independent system for audio-driven facial animation given the speech recognition system for just one language; e.g., English. The same method can also be used for text to audiovisual speech synthesis.

The invention is based on the recognition that once the alignment is generated, the mapping and the animation hardly have any language dependency in them. Translingual visual speech synthesis can be achieved if the first step of alignment generation can be made speech independent. In the following, we propose a method to perform translingual visual speech synthesis; that is, given a speech recognition system for one language (the base language), the invention provides a method of synthesizing video with speech of any other language (the novel language) as the input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
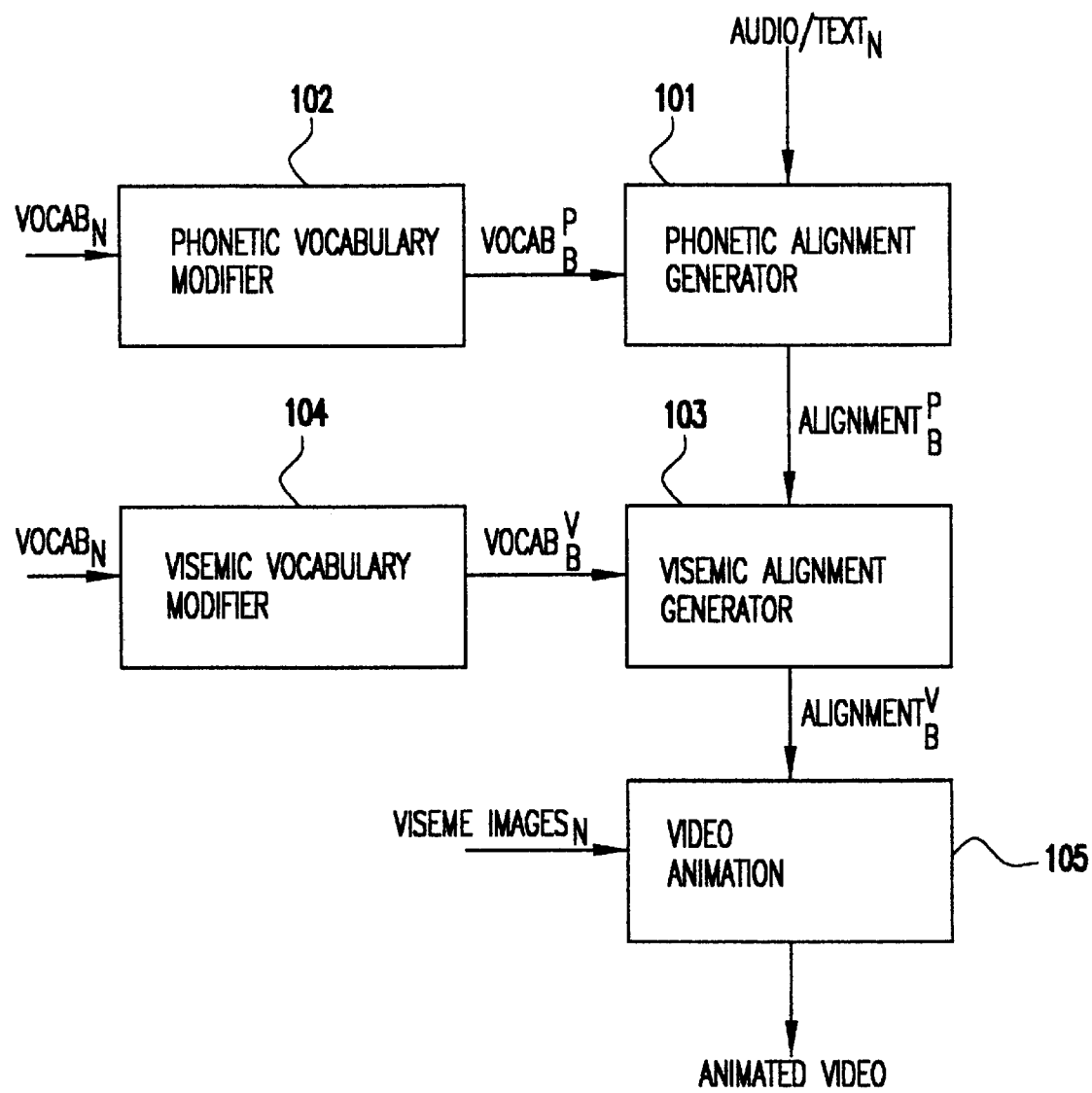
FIG. 1 is a block diagram showing the animation system which has the viseme database of the basic language.

In order to understand the translingual synthesis of the present invention, the steps required to animate the sequence are first presented:

1. From the given input audio and the text truth, we generate the phonetic alignment. This requires a speech recognition engine which could understand the phonetic base forms of the text. This would work fine if the input audio is in the same language as was the language used for training the recognition system.
2. If the language in which the video is to be synthesized is a different language, then the phone set of the different language may be other than the trained language. But the alignment generation system generates the alignments based on the best phone boundaries using its own set of phonemes. Then a mapping is required which can convert the phones from one language to the phones in the other language so as to get an effective alignment in the phone set of the novel language.
3. A phone to viseme mapping can then be used to get the corresponding visemic alignment which generates the sequence of visemes which are to be animated to get the desired video.
4. Animating the sequence of viseme images to get the desired video synthesized output aligned with the input audio signals.

The present invention provides a new approach to synthesize visual speech from a given audio signal in any language with the help of a speech recognition system in one language. From here onwards, we refer the language of training the speech recognition system as the base language and the language in which the video is to be synthesized as the novel language. In the illustrations, Hindi has been chosen as the novel language and English, as base language.

If a word in the novel language is presented to the alignment generator, then the alignment generator will not be able to generate the alignments for such a word as the word is not in the phonetic vocabulary of the training system. Moreover, the phonetic spelling of a word in novel language may not be represented completely by the phonetic set of the base language. We present below the technique to overcome these problems to finally have a language independent alignment generation system. This system will have the trained alignment generation system and the viseme images for the base language but it can be made to work to generate the animation for audio input in any language.

Vocabulary Adaptation Layer

In order to generate alignments for words in the novel language, first a phonetic vocabulary of this language is created wherein words are represented in the phonetic base forms using the phone set of the novel language. Since the recognition system is trained on the phone set of the base language, the vocabulary needs to be modified so that the words now represent the base forms in the base language phone set. Such a modification is made possible by the Vocabulary Modification Layer. This layer works by using a mapping from the phone set of one language to the other language. For illustration, a mapping from the Hindi phones to the English phones is as shown in Table 1.

TABLE 1

Phoneme Mapping from Hindi to English

| अ | AX | *** | छ | CH | ** | ब | B | *** |
|---|---|---|---|---|---|---|---|---|
| आ | AA | *** | ज | JH | *** | भ | B | ** |
| इ | IX | *** | झ | J | ** | म | M | *** |
| ई | IY | *** | ञ | NG | * | य | Y | *** |
| उ | UH | *** | ट | T | *** | र | R | *** |
| ऊ | UW | *** | ठ | T | ** | ल | L | *** |
| ए | EY | *** | ड | D | *** | व | V | *** |
| ऐ | AE | *** | ढ | D | ** | श | SH | *** |
| ओ | OW | *** | ण | N | ** | ष | SH | *** |
| औ | AU | *** | त | DH | ** | स | S | *** |
| क | K | *** | थ | TH | *** | ह | HH | *** |
| ख | K | ** | द | DH | *** | क्ष | K SH | * |
| ग | G | *** | ध | DH | ** | त्र | T R AX | * |
| घ | G | ** | न | N | *** | | G Y | * |
| ङ | N | ** | प | P | *** | | | |
| च | CH | *** | फ | F | *** | | | |

In Table 1 is presented an example of mapping phones of the Hindi language to the English language phone set. As is seen, not all the English phones are used by the novel language. Also, there exists an exact mapping for a large number of phones. These are shown by triple asterisks (*) on that row. A double asterisks () on the row implies that the mapping is not exact but it is the acoustically closest map. A single asterisk (*) in the mapping shows that the novel language phone has been approximated by a string of more than one phone (or phoneme) from the English language for acoustic similarity.

There are three possible cases:
1. The word in the novel language can be represented by the phones in the base language; for such words, the base forms can be simply written using the base language phone set.
2. The word in novel language cannot be represented by the base language phone set; then the word is written using the novel language phone set and the mapping as in Table 1 is used to convert the base form in the base language.
3. A phone in the base language never appears by the words in the novel language; in such a case, that particular phone in the base language is redundant and is left as "don't care".

Since the aim of mapping the phone set is to generate the best phone boundaries through acoustic alignment, the mapping is based on similar-sounding phones; i.e., if there is no exactly similar phone in the base language which can be associated with the phone in the novel language, then that base language phone is chosen which is acoustically similar. Both, however, may map to a different viseme.

The above vocabulary modification layer helps in generating the base language alignments of the novel language audio. Next, we describe how we extract the base language visemic alignments.

Generation of Visemic Alignments

Since the system has to work for any novel language using the trained alignment generator, phone to viseme mapping and the viseme set in the base language, visemic alignment cannot be simply generated from the phonetic alignment as generated previously. As was shown above, the vocabulary modification layer was built on the mapping based on acoustically similar phones. However, this mapping may distort the visemic alignment as it did not take into consideration the visemes corresponding to each such phone. So an additional vocabulary which represents the words of the novel language in phone set of base language is created. This does not use the mapping in Table 1. It uses a mapping based on the visemic similarity of the two phones in the same row. Using this additional vocabulary, the base language alignments and the base language phone-to-viseme mapping, we get the visemic alignments. This visemic alignment is used to generate the animated video sequence. The mapping is not one-to-one. So a single phone in base language may represent more than one phone in the novel language. This, however, creates no confusion as the Vocabulary Modification Layer outputs the alignment in the novel language after taking into account the many-to-one mapping.

Also, since the application uses the visemic alignment for the purpose of animation, a morphing is done from one viseme to another. So due to non-accurate mapping of phones which are represented by ** and * in Table 1, the generated alignment may not represent the exact phone boundaries. This however is not observed in the animated video as the viseme is always in transition during these boundaries. A smooth and continuous video is thus generated which does not reflect any inaccurate phone boundaries.

Description of the Drawings

Referring now to the drawings, and more particularly to FIG. 1, there is shown a block diagram of the animation system which has the viseme database in the base language. The phonetic alignment is first generated in the base language using the base language modified vocabulary. The audio or text in the novel language is input to the phonetic alignment generator 101 which receives the corresponding phonetic word $Vocab_B^P$ in the base language from the phonetic vocabulary modifier 102. The output of the phonetic alignment generator 101 is $Alignment_B^P$ which is then converted in the base language visemic alignment by using the visemic alignment generator 103. This visemic alignment generator uses the base language visemic vocabulary $Vocab_B^v$ which is formed by incorporating the corrections using the visemic vocabulary modifier 104. This visemic vocabulary modifier uses a visemically similar mapping from base language to the novel language to generate the $Vocab_B^v$. Then the generated base language visemic alignment $Aignment_B^v$ is used to drive the visemic images in the video animation 105 for generating the animated video.

In an alternative embodiment of the invention, if the viseme set is available for the novel language, then the lower layer can be modified to directly give the visemic alignment using the phone-to-viseme mapping in that language. Here the phonetic alignment generated in the base language is converted to the novel language by using the corresponding vocabulary entries in the two languages. Then the phoneme to viseme mapping of the novel language is applied. Note that the visemic alignment so generated is in the novel language and this was desired as the visemes are available in that language and not in the base language.

Figure 2:
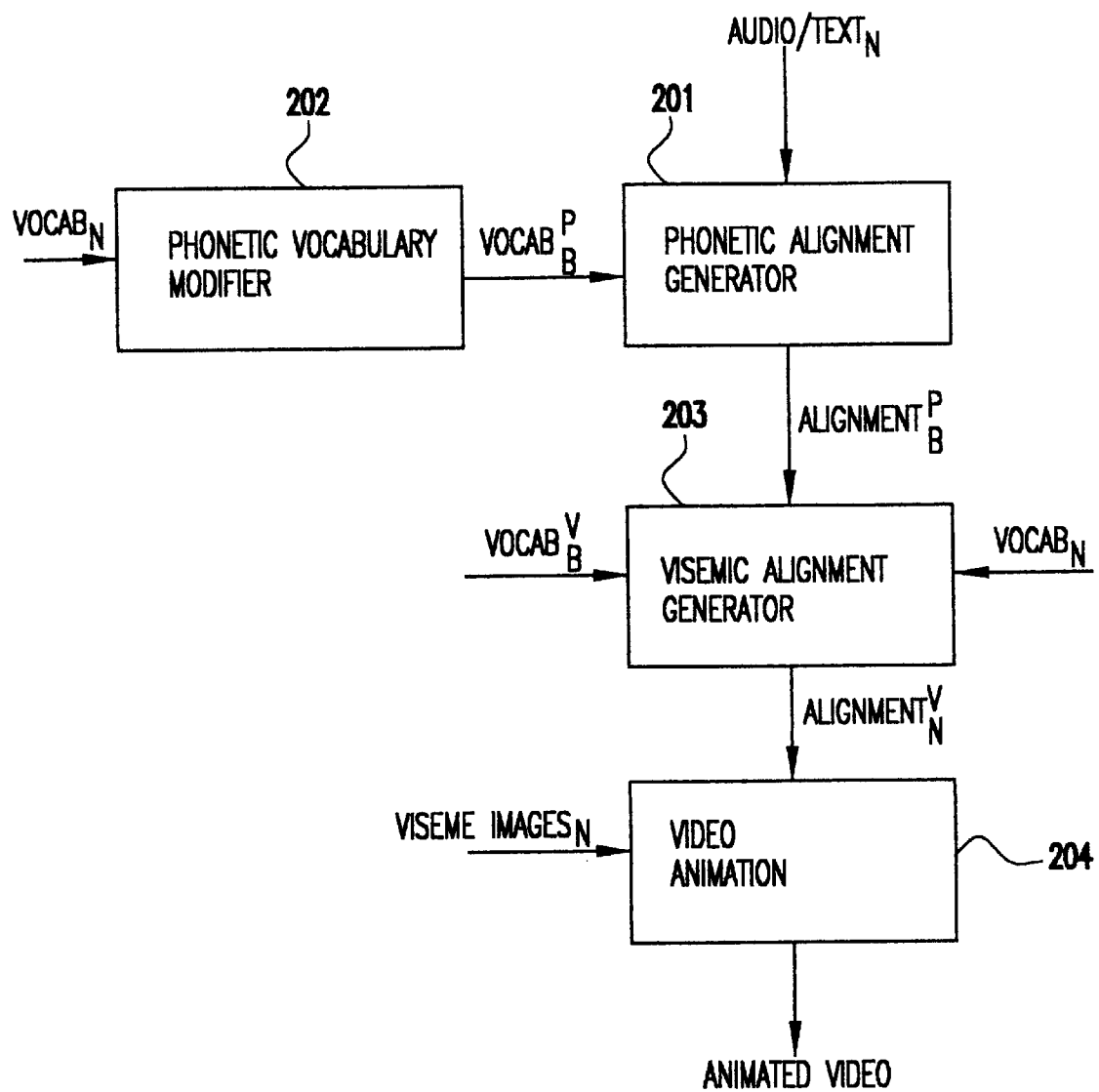
FIG. 2 is a block diagram showing the animation system which has the viseme database of the novel language.

FIG. 2 is a block diagram of the animation system which has the viseme database in the novel language. As in FIG. 1, the phonetic alignment is first generated in the base language using the base language modified vocabulary. The audio or text in the novel language is input to the phonetic alignment generator 201 which receives the corresponding phonetic word $Vocab_B^P$ in the base language from the phonetic vocabulary modifier 202. The output of the phonetic alignment generator 201 is $Alignment_B^P$ which is then converted in the visemic alignment generator 203. The base language phonetic alignment is converted to the novel language visemic alignment by using the novel language vocabulary $Vocab_N$ in addition to the base language visemic vocabulary $Vocab_B^v$. The novel language visemic alignment $Alignment_B^v$ is then used to drive the images (representing the novel language visemes) in video animation 204 for generating the animated video.

Figure 3:
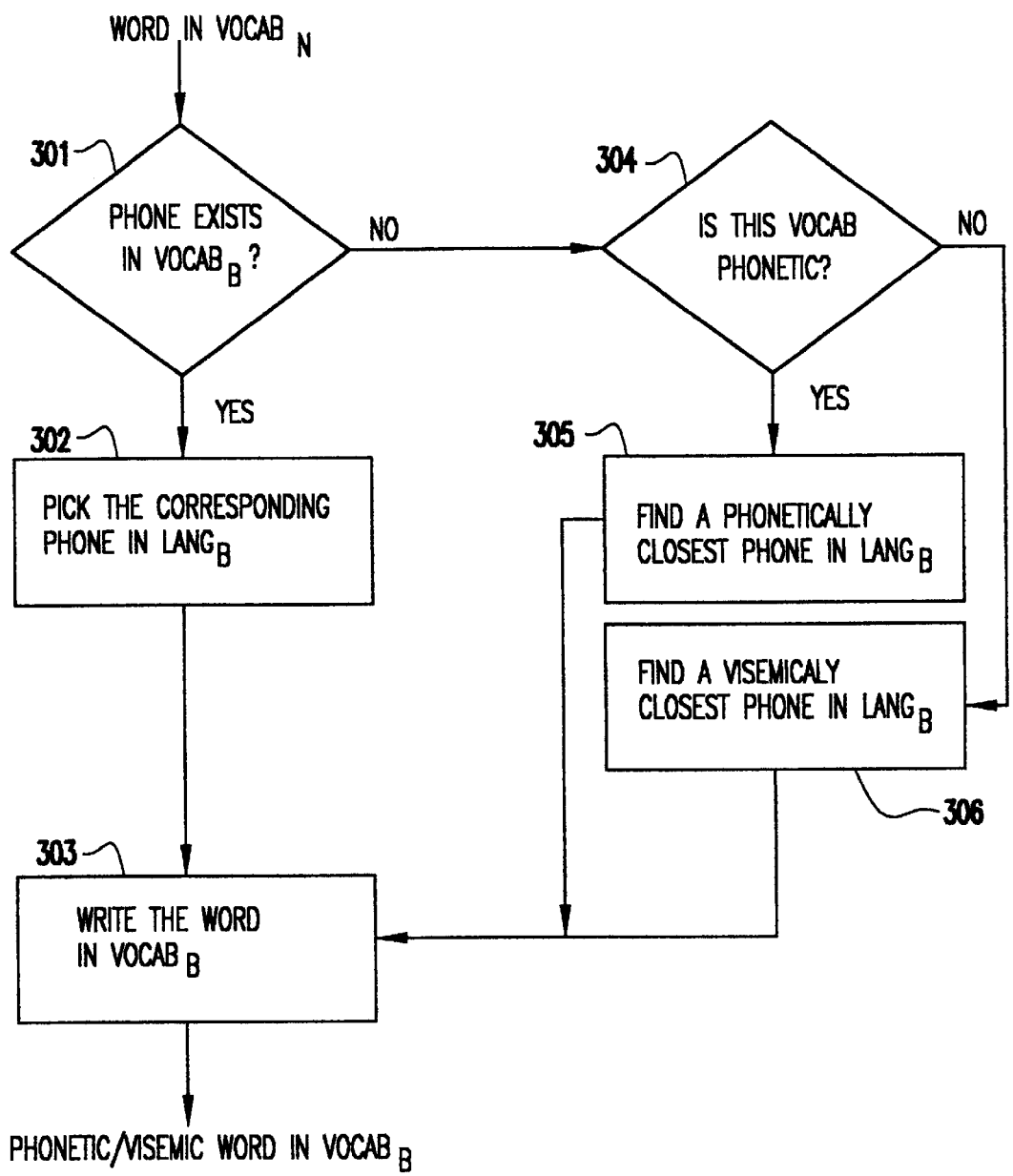
FIG. 3 is a flow diagram showing the process of creating the vocabulary which has the words in the novel language using the base forms of the base language.

FIG. 3 is a flow diagram of the process used to create the vocabulary which has the novel language words being represented in the transforms suing the base language phoneme set. Such a vocabulary is used to generate the phonetic alignments. For every word in the novel language, $lang_N$, a determination is made in decision block 301 to determine if it exists in the base language, $lang_B$. If it exits, the particular base forms are chosen in function block 302 that the word is in. The word is then copied in the base language vocabulary in function block 303. On the other hand, if the word does not exist in the base language, as determined in decision block 301, the base form representation is required before it can be written to the vocabulary. A determination is made in decision block 304 as to whether the vocabulary is to be based on the phonetic or the visemic similarity of the two languages. If phonetic similarity is to be used, a corresponding transform using the phonetic similar mapping is chosen in function block 305 from the base language, $lang_B$. On the other hand, if visemic similarity is to be used, a visemic similar phoneme set is then chosen in function block 306 from the base language to make a transition of the novel language word to the base language word. This approximated representation of the word in the base language is written to form the base language vocabulary in function block 303. These phonetic/visemic vocabularies so generated are then used for animation as shown in FIGS. 1 and 2.

An advantage of using the invention is that one does not need to build a speech recognition engine for the same language in which the visual speech is to be synthesized. Given a speech recognition system for any given language, one can easily and quickly customize the two layers to get a synthesized video in any other language. Moreover, the viseme images can also be of only the language of which the alignment generation system is built, thus obviating the need for every time generating new visemes images for each language. The system also works if the novel language has visemes that are totally different from the visemes of the base language as is shown in the alternative approach. Similarly, for text to audiovisual speech synthesis one does not need text to speech synthesizer in the same language in which the synthesis has to be performed.

While the invention has been described in terms of preferred embodiments, those skilled in the art will recognize that the invention can be practiced with modification within the spirit and scope of the appended claims.

We claim:

1. A method of translingual synthesis of visual speech from a given audio signal in a first language, comprising the steps of:

receiving input audio and text of the first language;

generating a phonetic alignment based on best phone boundaries using the speech recognition system of the second language and its own set of phones and mapping to convert the phones from the second language to the phones in the first language so as to get an effective alignment in the phone set of the first language;

performing a phone to viseme mapping to get a corresponding visemic alignment which generates a sequence of visemes which are to be animated to get a desired video; and animating the sequence of viseme images to get a desired video synthesized output aligned with the input audio signals of the first language.

2. The method of translingual synthesis of visual speech of claim 1, wherein the step of performing phone to viseme mapping is performed using a viseme database in the second language.

3. The method of translingual synthesis of visual speech of claim 1, wherein the step of performing phone to viseme mapping is performed using a viseme database in the first language.

4. A computer implemented method of implementing audio driven facial animation system in a first language, referred to as the novel language using a speech recognition system of a second language, referred to as the base language, the method comprising the steps of:

determining whether a correspondence exists between an audio speech signal of the novel language and a phone of the base language, and, if there is no correspondence between audio data of the novel language and a phone of the base language, identify a closest phone of the base language which best matches that of the novel language;

writing a word of the novel language into a base language database and adding it to a new vocabulary of a speech recognition system of the base language; and using the new vocabulary to generate a line alignment of the audio speech signal with a corresponding word of the base language vocabulary.

5. The computer implemented method of implementing audio driven facial animation system of claim 4, wherein the phonetically closest phone is chosen.

6. The computer implemented method of implementing audio driven facial animation system of claim 4, wherein the visemically closest phone is chosen.

7. The computer implemented method of implementing audio driven facial animation system of claim 4, the corresponding word of the base language vocabulary is a phonetic word.

8. The computer implemented method of implementing audio driven facial animation system of claim 4, the corresponding word of the base language vocabulary is a visemic word.

9. The computer implemented method of implementing audio driven facial animation system of claim 8, further comprising the step of using the time alignment system of the audio speech signal with a corresponding visemic word of the base language vocabulary to drive images in video animation for generating an animated video in the facial animation system in the first language.

* * * * *